United States Patent
Strohl et al.

[11] Patent Number: 5,545,017
[45] Date of Patent: Aug. 13, 1996

[54] UNIT FOR DELIVERING FUEL FROM A SUPPLY TANK TO THE INTERNAL COMBUSTION ENGINE OF A MOTOR VEHICLE

[75] Inventors: Willi Strohl, Beilstein; Rainer Lust, Sindelfingen, both of Germany

[73] Assignee: Robert Bosch GmbH, Stuttgart, Germany

[21] Appl. No.: 339,164

[22] Filed: Nov. 10, 1994

[30] Foreign Application Priority Data

Dec. 7, 1993 [DE] Germany ............... 43 41 564.4

[51] Int. Cl.[6] ..................................... F04B 17/03
[52] U.S. Cl. ............... 417/423.7; 417/353; 417/423.9
[58] Field of Search ............... 417/313, 423.1, 417/423.7, 423.9, 410.1, 352, 353, 357; 416/3; 415/55.1; 310/154, 156, 198

[56] References Cited

U.S. PATENT DOCUMENTS

| | | | |
|---|---|---|---|
| 2,068,820 | 1/1937 | Sarazin et al. | 310/93 |
| 2,768,583 | 10/1956 | Richard et al. | 417/354 |
| 3,171,356 | 3/1965 | Pensabene | 417/357 |
| 3,194,165 | 7/1965 | Sorlin | 417/353 |
| 3,561,891 | 2/1971 | Saint-Amand | 417/353 |
| 3,844,674 | 10/1974 | Moriyama | 417/352 |
| 4,164,690 | 8/1979 | Müller et al. | 417/423.7 |
| 4,551,645 | 11/1985 | Takamashi et al. | 310/198 |
| 4,861,237 | 8/1989 | Shiraki et al. | 417/353 |
| 5,149,253 | 9/1992 | Miyamoto et al. | 417/372 |
| 5,217,353 | 6/1993 | De Filippis | 417/354 |
| 5,332,374 | 7/1994 | Kricker et al. | 417/473.7 |

FOREIGN PATENT DOCUMENTS

| | | |
|---|---|---|
| 1285244 | 1/1962 | France . |
| 2340463 | 9/1977 | France . |
| 2686657 | 7/1993 | France . |
| 3303570 | 8/1994 | Germany . |

Primary Examiner—Peter Korytnyk
Attorney, Agent, or Firm—Edwin E. Greigg; Ronald E. Greigg

[57] ABSTRACT

A unit for delivering fuel from a supply tank to the internal combustion engine of a motor vehicle in which an electrical drive motor, which is embodied as an axial field motor, drives an impeller of a feed pump, which is embodied as a peripheral feed pump. In order to embody the delivery unit as flat as possible in the axial direction of the impeller, the rotor part of the axial field motor is disposed on the impeller, which carries the blades and which revolves in a pump chamber, and is combined with this impeller into one common element. The rotor windings of the rotor part can be disposed either inside a circle constituted by the blades of the feed pump or on the impeller radially outside the blades; the permanent magnets of the axial field motor are accordingly disposed in the housing, opposite the rotor windings.

9 Claims, 2 Drawing Sheets

UNIT FOR DELIVERING FUEL FROM A SUPPLY TANK TO THE INTERNAL COMBUSTION ENGINE OF A MOTOR VEHICLE

BACKGROUND OF THE INVENTION

The invention is based on a unit for delivering fuel from a supply tank to the internal combustion engine of a motor vehicle. German Offenlegungsschrift 33 035 709 discloses a delivery unit of this kind in which an electric drive motor and a feed pump driven to rotate by the motor are disposed in a common housing, which is connected on the suction side to the supply tank via a suction fitting and on the pressure side is connected via a pressure fitting to a feed line to the engine of a vehicle. The electric drive motor of the invention is embodied as an axial field motor, having a disk-shaped rotor part, guided on a shaft attached to the housing, that cooperates with permanent magnets disposed axially to it in a circle around the rotational axis of the rotor part. The rotary motion of the rotor part is transmitted to an impeller, which is embodied as the feed member of the feed pump and which is likewise guided on the shaft attached to the housing, which impeller aspirates the fuel via the suction fitting into a pump chamber, accelerates it, and supplies it to the pressure fitting at increased pressure. In order to be able to embody the measurements of the delivery unit as short as possible in the axial direction of the electric drive motor and feed pump, the rotor part and impeller have only a slight space between them or, as shown in FIGS. 9–12 of the cited patent disclosure document, are disposed occupying a common radial limiting plane.

The rotor part of the axial field motor and the impeller of the feed pump are combined in one disk-shaped element; involute-shaped feed fins, which have a curved course, are disposed on the face end of the rotor part and of the adjoining wall, which defines the pump chamber; during the rotating motion of the rotor, these feed fins feed fuel from a radially inner chamber to a radially outer chamber by increasing the pressure. The feed fins are constituted by means of conductor strips mounted on the rotor, which are charged via a commutator with an alternating, opposite electric potential. This commutator is embodied as a disk commutator, which is constituted by means of the radially internal part of the rotor; two commutator brushes, which are acted upon by differing electrical potential, are held in axial contact with one face end of the rotor by means of spring pressure.

The known fuel delivery unit has the disadvantage, though, that by means of the involute-shaped feed fins on the rotor part and on the face end chamber walls, it has a relatively complicated design, which results in a high cost of manufacture. Moreover, the feed pump reaches proper efficiency only at high speeds, which are connected to a high noise emission, so that it does not satisfy current requirements of a delivery unit for an internal combustion engine.

OBJECT AND SUMMARY OF THE INVENTION

The unit for delivering fuel from a supply tank to the internal combustion engine of a motor vehicle according to the invention has an advantage over the prior art that by means of the embodiment of the feed pump as a peripheral pump, a high pump efficiency is already reached at low speeds of the impeller, which contains the rotor part; this slow rotation engenders relatively little noise, so that the delivery unit contributes to reducing the overall noise produced by the motor vehicle.

In comparison to the known unit, the delivery unit according to the invention has a structurally simple design so that its cost of manufacture is comparatively lower.

By means of embodying the commutator as a drum commutator having commutator brushes radially contacting the commutator, a long service life of the commutator segments can be achieved despite a very space-saving axial arrangement of the commutator. With suitable shaping of the permanent magnets or their one-sided arrangement on the face end of the impeller remote from the commutator, it is possible to make the peg which holds the drum commutator segments short, so that the commutator segments lead directly to the face end of the impeller, which contains the rotor part; thus the entire delivery unit can be embodied as flatter still and can therefore be inserted even into very flat fuel tanks.

The integration of a fuel filter into the housing contributes to this very flat and compact design of the delivery unit, for which purpose this filter, which is advantageously likewise disk-shaped and which extends over the diameter of the impeller, constitutes a housing cover that closes the housing on its one face end. Consequently it is possible, with a very large fuel flow cross section, to integrate the fuel filter into the delivery unit without taking up additional space; moreover by means of this an additional housing cover can be omitted.

In order to achieve a further simplification of the impeller, having the rotor part integrated into it, it is also possible to embody this as a simple spool and to alternatingly charge the elements of the stator attached to the housing, in which case the commutator disposed on the impeller could then be omitted, which would once again reduce the axial space of the unit; the stator elements can then be electronically commutated.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
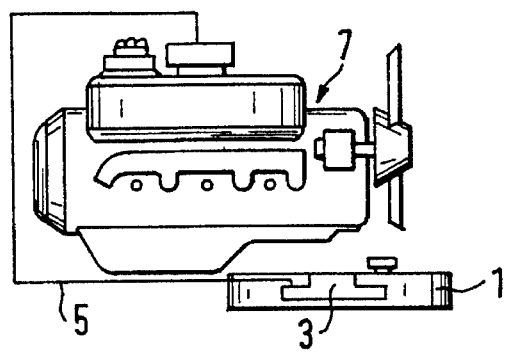
FIG. 1 shows a schematic representation of the arrangement of the delivery unit in a supply tank of an internal combustion engine.

In the arrangement shown in FIG. 1, a delivery unit 3 is inserted in a fuel supply tank 1 and communicates on the pressure side via a feed line 5 with an internal combustion engine 7 of a motor vehicle and supplies it with fuel during its operation.

Figure 2:
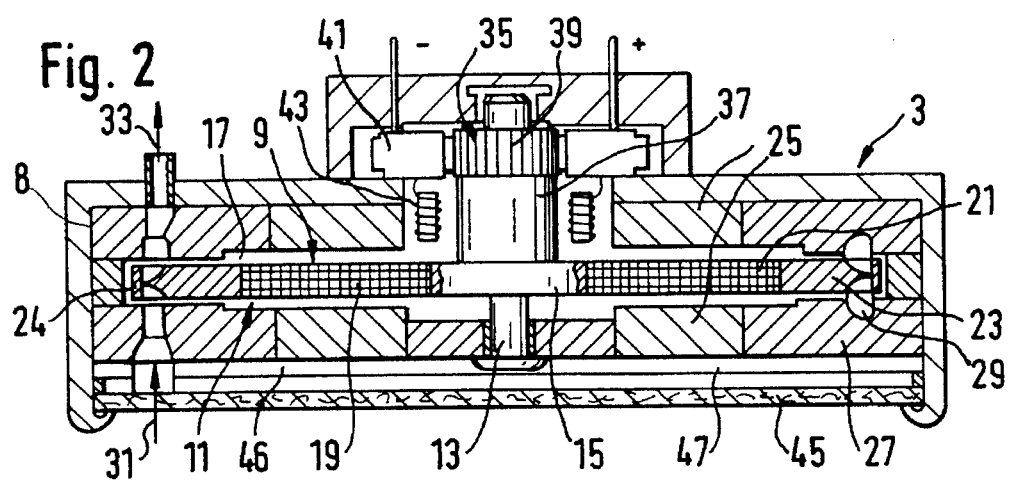
FIG. 2 shows a longitudinal section through a first exemplary embodiment of the delivery unit in which the blades of the impeller are disposed radially on the exterior of the rotor part.

The first exemplary embodiment of the delivery unit 3 shown in FIG. 2 is embodied of an electric axial field motor 9 and a peripheral pump 11 driven by it disposed together in a common, cylindrical housing 8. The delivery unit 3 has an impeller 15, which is disposed on a shaft (13) attached within the housing 8 and which revolves in a cylindrical pump chamber 17. A rotor part 19 of the axial field motor 9 as well as feed elements of the peripheral pump 11 are disposed on the impeller 15, which is depicted in an extremely simplified manner in FIG. 3. To that end, on its axial face ends, the disk-shaped impeller 15 has radially outward pointing rotor windings 21, which are embodied as flat and which are constituted by means of winding paths disposed in the disk surface, which when charged generate an axial field and which are coated with an electrically nonconductive, fuel resistant material so that the individual rotor windings 21 are delimited against each other. A ring of blades 23 is disposed on the impeller 15, which blades 23 are disposed spaced apart from one another in the circumference direction of the impeller 15, are directed outward, and radially adjoin the rotor part 19, which contains the rotor windings 21; the blades 23 constitute the feed elements of the peripheral pump 11 and transition in the exemplary embodiment in a radially outward pointing direction into a ring 24, which encompasses the impeller 15.

Figure 3:
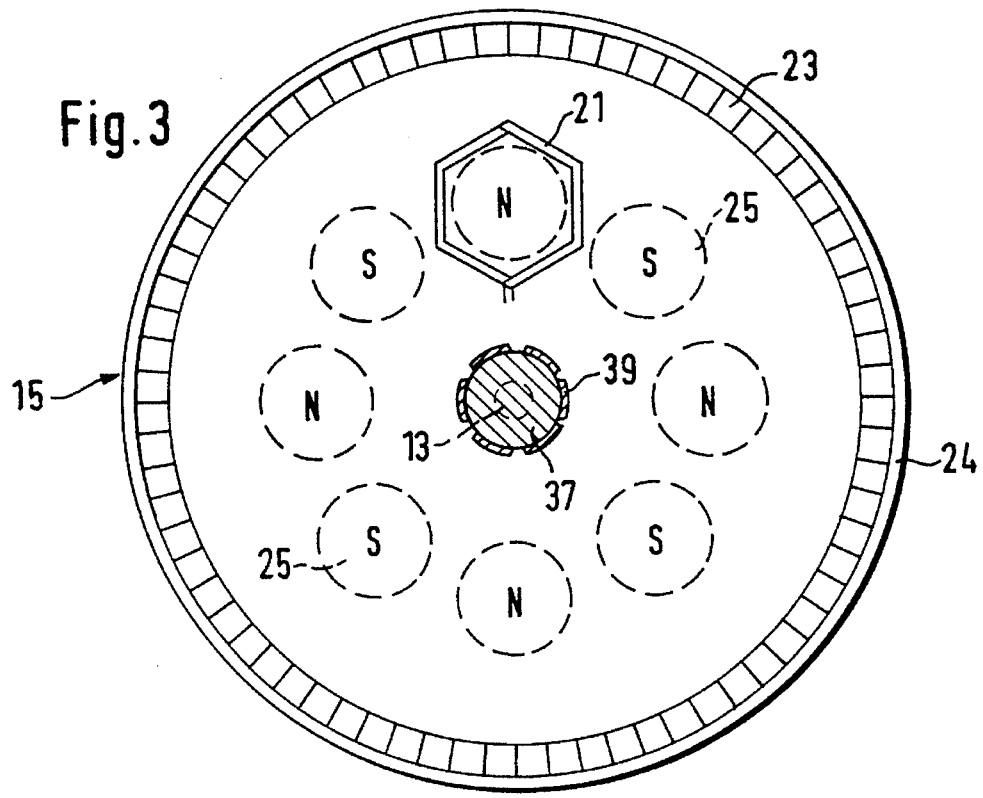
FIG. 3 shows a simplified section through the impeller from FIG. 2, having an indicated position of the permanent magnets.

Furthermore, permanent magnets 25 are disposed inside the housing 8 in a circular arrangement around the rotational axis of the impeller 15 on opposite sides of the rotor windings 21, having an axially pointing magnetic field disposed on both sides of the impeller 15 so that the magnets adjoining one another and the magnets opposite one another, respectively, have an opposite Potential. These permanent magnets 25, also indicated in FIG. 3, are adjoined in the radially outward-pointing direction by a disk-shaped base body 27 in the housing 8 in a radial alignment with each of the permanent magnets and on opposite sides of the blades 23. A partial ring-shaped supply conduit 29, which runs around the rotational axis of the impeller 15 and which is open to the impeller 15, is provided in the face end of the housing that defines the pump chamber 17 and is oriented toward the impeller 15. This supply conduit 29 begins on its one end at an inlet opening 31 and leads to an outlet opening 33 disposed staggered from the inlet by an angular range of approximately 300° (shown staggered); during operation, the revolving impeller 15 produces a hydraulic communication between the inlet opening 31 disposed in the one part of the base body 27 and the outlet opening 33 disposed in the opposite part of the base body 27 by means of the blades 23, which make possible fuel penetration from the one face end of the impeller 15 to the other.

For an alternating charge of the rotor windings 21 on the impeller 15, it has a so-called drum commutator 35, which is constituted by means of a concentric peg 37, which axially protrudes from the one face end of the impeller 15, on whose circumferential face commutator segments 39 are disposed parallel to the axis of the impeller 15, connected electrically to the individual rotor windings 21. Two commutator brushes 41 disposed opposite each other in the housing 8 and acted upon by different electric potentials are held in contact with these segments 39 by means of the spring pressure of two pressing springs 43, or run on the commutator segments 39 during the rotary motion of the impeller 15 and the drum commutator 35 connected to it in a manner fixed against relative rotation.

The housing is closed on its face end remote from the commutator 35 by means of a flat, disk-shaped fuel filter 45, which is inserted in the housing 8 such that a fuel collecting chamber 47 remains between the housing and the face end of a spacer disk 46 remote from the impeller 15, which disk fixes the position of the permanent magnets 25 and of the base body 27, so that the entire surface of the fuel filter 45 can be used as a flow cross section.

The inlet and outlet openings 31, 33 are disposed respectively in the base body 27 so that the inlet opening 31 feeds into the fuel collection chamber 47 while the outlet opening 33 emerges on the opposite face end of the disk-shaped housing 8.

Figure 4:
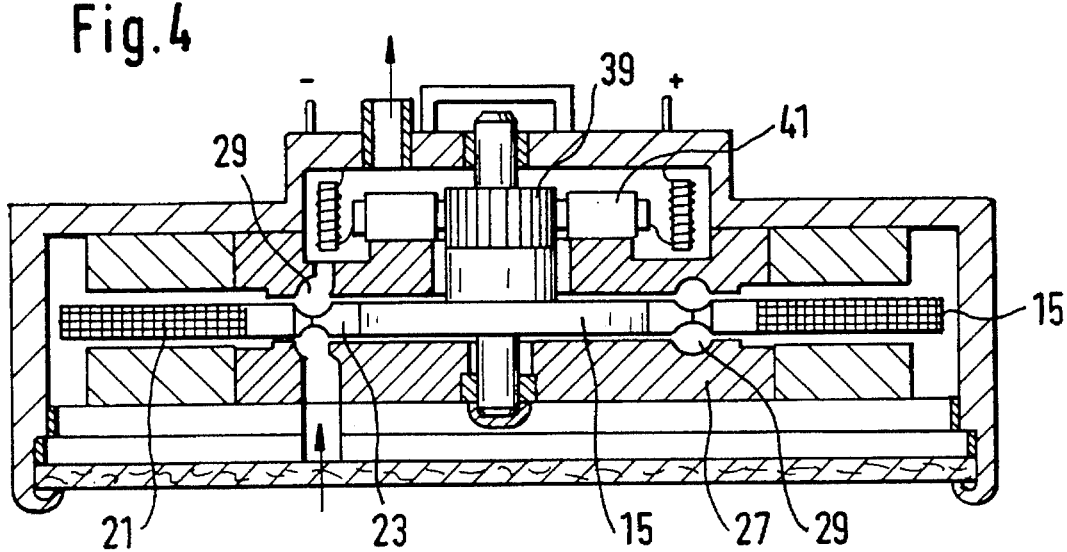
FIG. 4 shows a longitudinal section through a second exemplary embodiment of the delivery unit in which the blades of the impeller are disposed radially on the interior of the rotor part.
Figure 5:
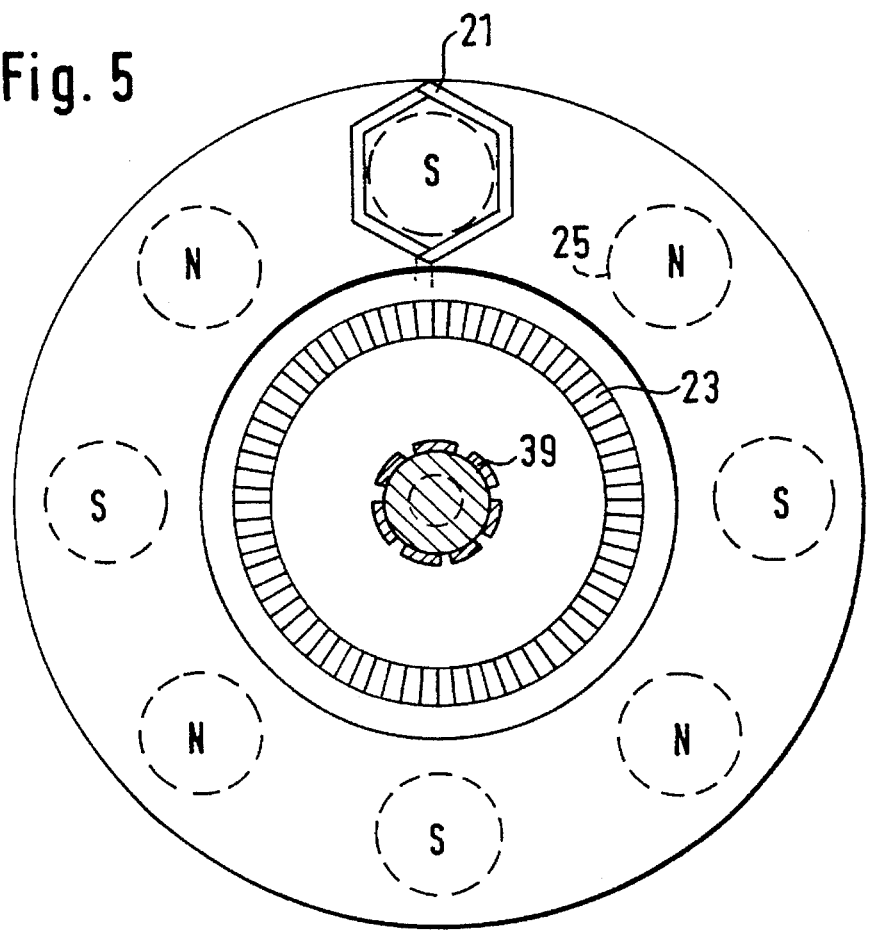
FIG. 5, analogous to FIG. 3, shows a simplified section through the impeller shown in FIG. 4.

The second exemplary embodiment shown in FIGS. 4 and 5 differs from the first exemplary embodiment shown in FIGS. 2 and 3 in terms of the arrangement of the rotor part and feed elements.

In the second exemplary embodiment, the ring of the blades 23 is disposed adjoining the impeller 15, radially inward of the impeller part which carries the rotor windings 21. Accordingly, the ring 0f permanent magnets 25 is also disposed radially adjoining the outward base body 27, which contains the supply conduits 29; the arrangement of the inlet and outlet openings 31, 33 in the base body 27, as well as the construction of the drum commutator 35, is achieved in a manner analogous to the first exemplary embodiment. The electrical lines lead through the respective blades 23 to make contact between the commutator segments 39 and the individual rotor windings 21.

The delivery unit according to the invention functions as follows: Upon charging of the commutator brushes 41, the individual rotor windings 21 receive an electric current, which, in interaction with the magnetic field generated by the permanent magnets 25, produces a torque on the impeller 15 so that it moves in a rotational direction determined by the arrangement of the permanent magnets 25. In a known manner, this rotary motion of the impeller 15 achieves a delivery of fuel from the inlet opening 31 to the outlet opening 33 by means of the motion of the blades 23 in the supply conduit 29; the fuel pressure is increased while flowing through the supply conduit 29 by means of the impulse exchange between the fuel flowing in the supply conduit and that accelerated in the impeller. The fuel from the supply tank 1, which is at a low pressure, is taken in via the fuel filter 45 and delivered to the internal combustion engine 7 at an increased pressure via the supply line 5 connected to the outlet opening 33.

It is consequently possible in a structurally simple manner to transfer the advantages of an axial field motor, which is designed as flat, to a peripheral pump and thus to preserve a delivery unit designed to be very small in the axial direction, whose delivery output and noise emission meet the high demands made of modern fuel delivery units.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A unit for delivering fuel from a supply tank (1) to an internal combustion engine (7) of a motor vehicle, having an electric drive motor (9), which is embodied as an axial field motor, having permanent magnets (25) disposed axially in a circle around a rotational axis of a disk-shaped rotor part (19), said disk-shaped rotor part is provided on at least one face end with rotor windings (21) and at the same time forms a part of an impeller (15) of a feed pump (11), said impeller revolves in a pump chamber (17); feed elements of this feed pump (11) are disposed on the impeller (15) and hydraulically connect an inlet opening (31) into the pump chamber (17) to an outlet opening (33) leading out of the pump chamber, the feed elements are embodied on the impeller (15) by a ring of blades (23), which are disposed spaced apart from one another along a circumference of the impeller (15) and are disposed in a supply conduit provided between pump chamber walls that axially define the pump chamber (17), said supply conduit extends from the inlet opening (31) to the outlet opening (33) in a partial ring around the rotational axis of the impeller (15), the supply conduit together with the impeller (15) forms one supply conduit (29).

2. The unit according to claim 1, in which the partial ring-shaped supply conduit (29) is provided in each of the pump chamber walls, said supply conduit is open to the impeller (15), and the blades (23) communicate with the supply conduits.

3. The unit according to claim 1, in which the rotor windings (21) of the rotor part (19) are embodied as radially outward pointing, flat windings, which are coated with an electrically nonconductive, fuel resistant material.

4. The unit according to claim 3, in which the disk-shaped impeller (15), into which the rotor part (19) is integrated, has a concentric, axially protruding peg (37) on one face end, on whose radial circumferential face are disposed commutator segments (39), which run axially and which are connected to the individual rotor windings (21), against which segments, at least two commutator brushes (41) are held in radial contact by means of spring pressure, which brushes are disposed opposite each other and are acted upon by different electrical potentials.

5. The unit according to claim 1, in which the housing (8) which contains the axial field motor (9) and the feed pump (11) is embodied as essentially cylindrical and that one face end is closed by means of a flat, disk-shaped fuel filter (45), which precedes the inlet opening (31).

6. The unit according to claim 1, in which the rotor part (19) and the impeller (15) are embodied as essentially one part, and the blades (23) of the impeller (15) are disposed in a circle outside the rotor windings (21) of the rotor part (19).

7. The unit according to claim 1, in which permanent magnets (25) are disposed in the housing (8), facing opposite sides of the rotor windings situated on the impeller (15).

8. The unit according to claim 1, in which the impeller (15) is rotatably guided on a shaft (13), which is supported so as to be attached to the housing.

9. A unit for delivering fuel from a supply tank (1) to an internal combustion engine (7) of a motor vehicle, having an electric drive motor (9), which is embodied as an axial field motor, having permanent magnets (25) disposed axially in a circle around a rotational axis of a disk-shaped rotor part (19), said disk-shaped rotor part is provided on at least one face end with rotor windings (21) and at the same time forms a part of an impeller (15) of a feed pump (11), said impeller revolves in a pump chamber (17); feed elements of this feed pump (11) are disposed on the impeller (15) and hydraulically connect an inlet opening (31) into the pump chamber (17) to an outlet opening (33) leading out of the pump chamber, the feed elements are embodied on the impeller (15) by a ring of blades (23), which are disposed in a circle radially inwardly of the rotor windings (21) and are disposed in a supply conduit provided between pump chamber walls that axially define the pump chamber (17), said supply conduit extends from the inlet opening (31) to the outlet opening (33) in a partial ring around the rotational axis of the impeller (15), the supply conduit together with the impeller (15) forms one supply conduit (29), wherein electrical lines which make contact between a commutator and the rotor windings extend through the blades (23).

* * * * *